(12) United States Patent
Bushko et al.

(10) Patent No.: US 10,321,238 B2
(45) Date of Patent: Jun. 11, 2019

(54) MINIATURE DEVICE HAVING AN ACOUSTIC DIAPHRAGM

(71) Applicant: Bose Corporation, Framingham, MA (US)

(72) Inventors: Wit Bushko, Milford, MA (US); Thomas Landemaine, Allston, MA (US); Prateek Nath, Southborough, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/875,866

(22) Filed: Jan. 19, 2018

(65) Prior Publication Data
US 2018/0160231 A1    Jun. 7, 2018

Related U.S. Application Data

(62) Division of application No. 15/182,069, filed on Jun. 14, 2016, now Pat. No. 9,913,042.

(51) Int. Cl.
*H04R 9/06* (2006.01)
*B32B 38/18* (2006.01)
(Continued)

(52) U.S. Cl.
CPC ............... *H04R 9/06* (2013.01); *B32B 38/18* (2013.01); *H04R 7/06* (2013.01); *H04R 7/10* (2013.01);
(Continued)

(58) Field of Classification Search
CPC ... H04R 9/06; H04R 7/06; H04R 7/18; H04R 31/003; H04R 2307/025; B32B 38/18; B32B 2307/51
See application file for complete search history.

(56) References Cited

U.S. PATENT DOCUMENTS

| | | |
|---|---|---|
| 2,657,758 A | 11/1953 | Varnet |
| 3,851,037 A | 11/1974 | Day et al. |

(Continued)

FOREIGN PATENT DOCUMENTS

| | | |
|---|---|---|
| DE | 533786 C | 9/1931 |
| DE | 10303247 A1 | 8/2004 |

OTHER PUBLICATIONS

International Search Report and Written Opinion in PCT/US2018/039281 dated Oct. 2, 2018; 14 pages.
(Continued)

*Primary Examiner* — Tuan D Nguyen
(74) *Attorney, Agent, or Firm* — Schmeiser, Olsen & Watts LLP; William G. Guerin

(57) ABSTRACT

A method of forming a device having a compliant member includes creating a membrane having one or more elastomeric layers which are at least partially cured. Another elastomeric layer is provided on the membrane in an uncured state. At least one of a bobbin and a housing are positioned so that an end of the bobbin or housing, or the ends of both the bobbin and housing, extend at least partially into the uncured elastomeric layer. The uncured elastomeric layer is then cured to secure it to the membrane and to the housing or bobbin, or both the housing and bobbin. The method substantially reduces or eliminates the formation of holes that can form during fabrication or use of the device.

13 Claims, 6 Drawing Sheets

(51) Int. Cl.
*H04R 7/06* (2006.01)
*H04R 7/18* (2006.01)
*H04R 31/00* (2006.01)
*H04R 7/10* (2006.01)
*H04R 7/16* (2006.01)

(52) U.S. Cl.
CPC ............. *H04R 7/18* (2013.01); *H04R 31/003* (2013.01); *B32B 2307/51* (2013.01); *H04R 7/16* (2013.01); *H04R 2307/025* (2013.01)

(56) References Cited

U.S. PATENT DOCUMENTS

| | | | |
|---|---|---|---|
| 4,088,847 A | 5/1978 | Yukimoto et al. | |
| 4,395,598 A | 7/1983 | Lesage | |
| 4,410,768 A | 10/1983 | Nakamura et al. | |
| 4,817,165 A | 3/1989 | Amalaha | |
| 5,472,736 A | 12/1995 | Barr et al. | |
| 5,566,242 A | 10/1996 | Hall | |
| 6,757,404 B2 | 6/2004 | Takewa et al. | |
| 8,107,665 B2 | 1/2012 | Haapapuro et al. | |
| 9,049,511 B2 | 6/2015 | Shen | |
| 9,888,306 B2 | 2/2018 | Worrell et al. | |
| 9,955,266 B2 | 4/2018 | Liu et al. | |
| 2006/0062422 A1 | 3/2006 | Ono et al. | |
| 2006/0266577 A1 | 11/2006 | Inoue et al. | |
| 2011/0317869 A1 | 12/2011 | Fujitani et al. | |
| 2012/0018611 A1 | 1/2012 | Ishii et al. | |
| 2012/0263338 A1 | 10/2012 | Hori et al. | |
| 2013/0279729 A1 | 10/2013 | Richards | |
| 2014/0241565 A1 | 8/2014 | Jin | |
| 2015/0312660 A1 | 10/2015 | Lembacher et al. | |
| 2015/0326975 A1* | 11/2015 | Takada | H04R 3/00 381/407 |
| 2016/0121814 A1 | 5/2016 | Foss et al. | |
| 2016/0185036 A1 | 6/2016 | Yamasaki et al. | |
| 2017/0078800 A1 | 3/2017 | Guthy et al. | |
| 2017/0129143 A1 | 5/2017 | Otto et al. | |
| 2017/0359657 A1 | 12/2017 | Bushko et al. | |
| 2018/0338207 A1 | 11/2018 | Nath et al. | |

OTHER PUBLICATIONS

International Search Report & Written Opinion in International Patent Application No. PCT/US17/033283, dated Aug. 11, 2017; 15 pages.
Restriction Requirement in U.S. Appl. No. 15/182,069, dated Jun. 8, 2017; 5 pages.
Non-Final Office Action in U.S. Appl. No. 15/182,069, dated Jul. 6, 2017; 9 pages.
Final Office Action in U.S. Appl. No. 15/182,069, dated Oct. 11, 2017; 9 pages.
Notice of Allowance in U.S. Appl. No. 15/182,069, dated Dec. 19, 2017; 11 pages.
International Search Report and Written Opinion in International Patent Application No. PCT/US18/28788, dated Jun. 25, 2018; 16 pages.
"How to make silicone molds," Colorful-crafts.com, Jun. 23, 2016.
International Preliminary Report on Patentability in PCT/US2017/033283 dated Dec. 27, 2018; 10 pages.
Non-Final Office Action in U.S. Appl. No. 15/661,155 dated Jan. 9, 2019; 8 pages.
Non-Final Office Action in U.S. Appl. No. 15/598,065 dated Jan. 28, 2019; 13 pages.

* cited by examiner

MINIATURE DEVICE HAVING AN ACOUSTIC DIAPHRAGM

RELATED APPLICATIONS

This application is a divisional application of U.S. application Ser. No. 15/182,069, filed Jun. 14, 2016 and titled "Miniature Device Having an Acoustic Diaphragm," the entirety of which application is incorporated by reference herein.

BACKGROUND

This disclosure relates to a miniature device having a compliant member. More particularly, the disclosure relates to a method of fabricating an acoustic diaphragm on the miniature device.

SUMMARY

In one aspect, a microspeaker device includes an acoustic diaphragm, a housing, a bobbin and a coil. The acoustic diaphragm has a substantially planar shape and includes a first layer of an elastomeric material and a second layer of an elastomeric material disposed on the first layer of elastomeric material. The housing has an end extending at least partially into the second layer, wherein the second layer adheres to the first layer and to a portion of the housing at the end of the housing. The bobbin has a surface and is disposed in the housing. The bobbin has an end extending at least partially into the second layer, wherein the second layer adheres to a portion of the bobbin at the end of the bobbin. The coil is wound on the surface of the bobbin.

Examples may include one or more of the following:

The acoustic diaphragm may further include at least one intermediate layer disposed between the first layer and the second layer. The at least one intermediate layer may be formed of a viscous elastomeric material. The at least one intermediate layer may include a layer formed of an elastomeric material that is more viscous than the elastomeric material of the first layer and the elastomeric material of the second layer.

The first layer may have a thickness that is greater than a thickness of the second layer.

At least one of the first and second layers may be a silicone layer. The silicone layer may be formed of a room temperature vulcanization silicone.

An area of the acoustic diaphragm defined within a diameter of the bobbin may be stiffer than a surrounding annular area of the acoustic diaphragm.

The housing may be a tube having an opening at the end.

The elastomeric material of the first layer may be different from the elastomeric material of the second layer.

The second layer may include a meniscus formed at a surface of the bobbin or the housing.

The end of the housing may be in contact with a surface of the first layer and the end of the bobbin may be in contact with a surface of the first layer.

BRIEF DESCRIPTION OF THE DRAWINGS

The above and further advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

Modern in-ear headphones, or earbuds, typically include microspeakers. The microspeaker may include a coil that is attached to an acoustic diaphragm either directly or through a bobbin on which the coil is wound. Motion of the diaphragm due to an electrical signal provided to the coil results in generation of an acoustic signal that is responsive to the electrical signal. The microspeaker typically includes a housing, such as a sleeve or tube, which encloses the bobbin, coil and a magnetic structure. As the size of the earbud decreases, it becomes increasingly difficult to fabricate the acoustic diaphragm with an elastic suspension at one end of the bobbin (or coil) and housing.

Figure 1A:
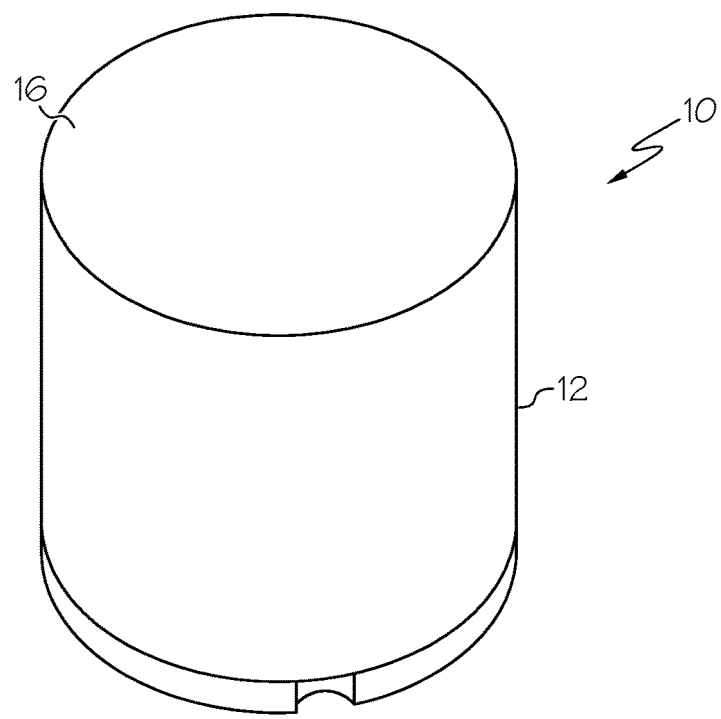
FIG. 1A, FIG. 1B and FIG. 1C are a perspective illustration, a perspective cutaway illustration and an exploded cutaway illustration, respectively, of an example of a microspeaker for a miniature earbud.
Figure 1B:
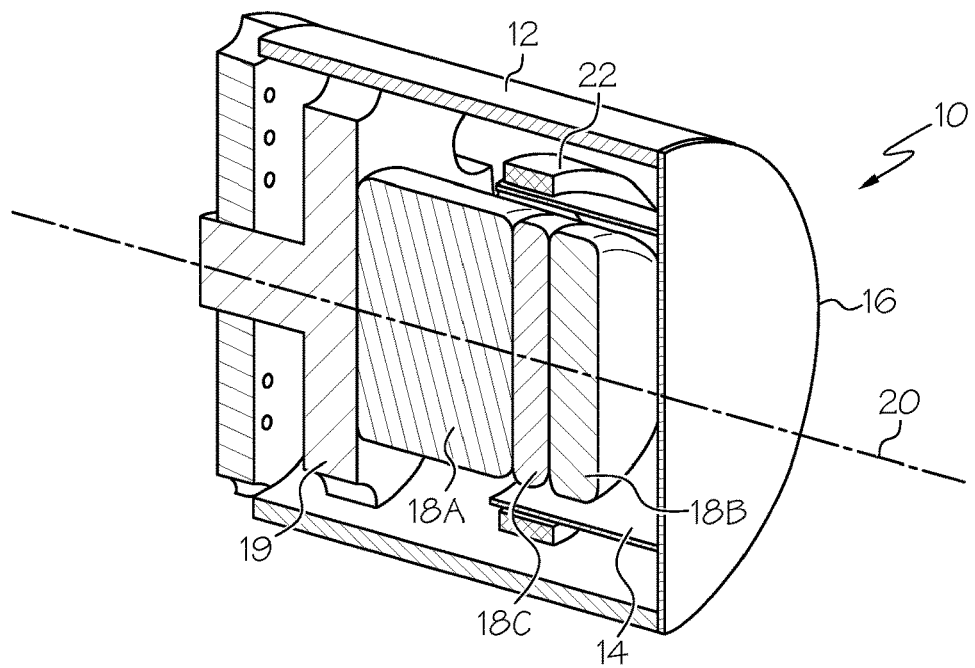
Figure 1C:
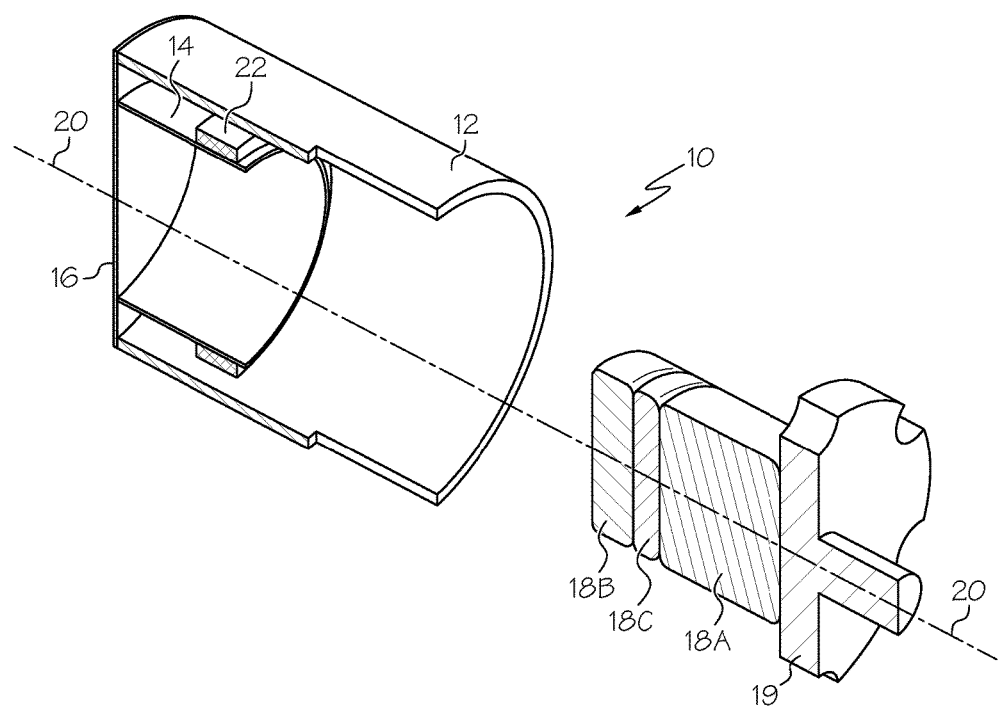

FIG. 1A, FIG. 1B and FIG. 1C are a perspective illustration, a perspective cutaway illustration and an exploded cutaway illustration, respectively, of an example of a microspeaker 10 that can be used in a miniature earbud. The microspeaker 10 includes a cylindrical housing 12 having an opening at both ends. Inside the housing 12 is a bobbin 14 that is nominally cylindrical in shape and which is open at least at one end. The housing 12 and bobbin 14 are secured at one of their ends to a compliant member 16. In some examples, the housing 12 is made of stainless steel and the bobbin 14 is made of a polyimide (e.g., KAPTON®) or polyethylene terephthalate (PET) (e.g., MYLAR®). A magnet assembly 18 is secured to a platform 19 at an end of the housing that is opposite to the compliant member 16. The magnet assembly 18 includes two magnet pieces 18A and 18B separated by a coin 18C. The magnet assembly 18 extends along an axis 20 of the housing 12 and into an open region inside the bobbin 14. In one example, the magnet pieces 18A and 18B are cylindrical neodymium magnets. A coil 22 is wound onto an outside surface of the bobbin 14. The bobbin 14 moves substantially along the housing axis 20 in response to an electrical current conducted through the coil 22. In turn, a central circular portion of the compliant member 16 moves axially and displaces air to thereby create an acoustic signal.

One technique for fabricating the compliant member 16 includes placing an open end of the housing 12 and an open end of the bobbin 14 into a single thin layer of liquid silicone. The liquid silicone is then cured to form the compliant member 16. The central region of the compliant member 16 that is located within the end region of the bobbin can be stiffened while the annular region that surrounds the central region remains compliant. Difficulties arise with this technique as the liquid silicone has a surface tension that causes the liquid to adhere to and "climb up" the walls of the housing 12 and the bobbin 14 to form a meniscus. The result is a reduction of the thickness of the cured layer of silicone which can lead to holes in the compliant member 16. Holes can form during the demolding process because the compliant member 16 is weak at thin areas. Thinned areas may result in holes or tearing being generated during operation of the microspeaker.

Figure 2:
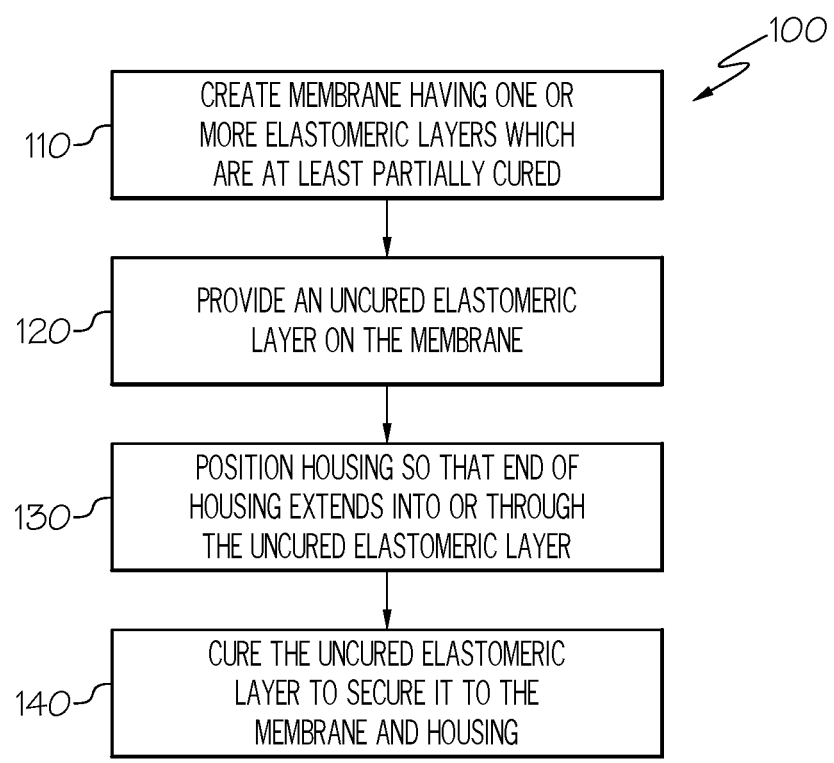
FIG. 2 is a flowchart representation of a method of forming a device having a compliant member.

FIG. 2 is a flowchart representation of an example of a method 100 of forming a device having a compliant member. Reference is also made to FIGS. 3A to 3E which are cross-sectional side view illustrations showing, in a sequential manner, the method 100 as applied to fabrication of a microspeaker device 20 in which the compliant member 16 can subsequently be processed to form an acoustic diaphragm and a surround.

According to the method 100, a membrane is created (110) having one or more elastomeric layers which are at least partially cured. As used herein, the term "partially cured" means that a skin coat is formed on top of an elastomeric layer to a degree that the elastomeric material in that layer will not flow or mix with a new layer of liquid elastomeric material deposited on the partially cured layer. As an alternative, the degree of cure can be controlled so that there is some mixing that occurs at the interface of two layers.

Figure 3A:
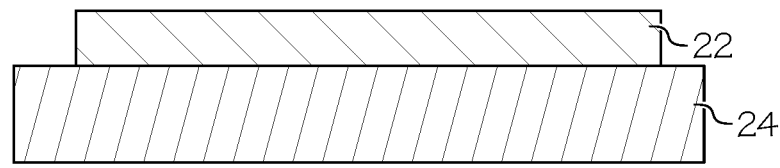
FIGS. 3A to 3E are cross-sectional illustrations showing sequentially how the method of FIG. 2 is applied to fabricate a microspeaker device.

As shown in FIG. 3A, the membrane can be formed by depositing a layer 22 of a liquid elastomeric material such as liquid silicone on a surface of a substrate 24. The viscosity of the silicone generally is sufficient such that the thickness of the applied layer does not significantly change although surface features and bumps typically disappear over time until the surface is substantially flat. The liquid elastomeric material is then partially or fully cured. In one example, the silicone is cured using a platinum catalyst in a 150° C. environment for approximately 45 minutes. Although not shown, this step may be repeated to form a multi-layer membrane by depositing one or more additional layers of a liquid elastomeric material and then partially or fully curing each of these layers before applying an additional layer. These subsequent layers may be similarly cured at 150° C. but for longer times (e.g., several hours or more). In alternative methods, an ultraviolet (UV) cure may be used or a room temperature vulcanization (RTV) silicone may be used.

Figure 3B:
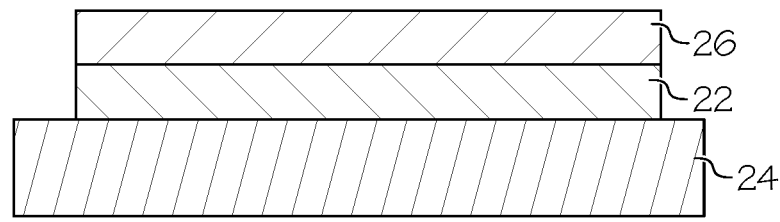
Figure 3C:
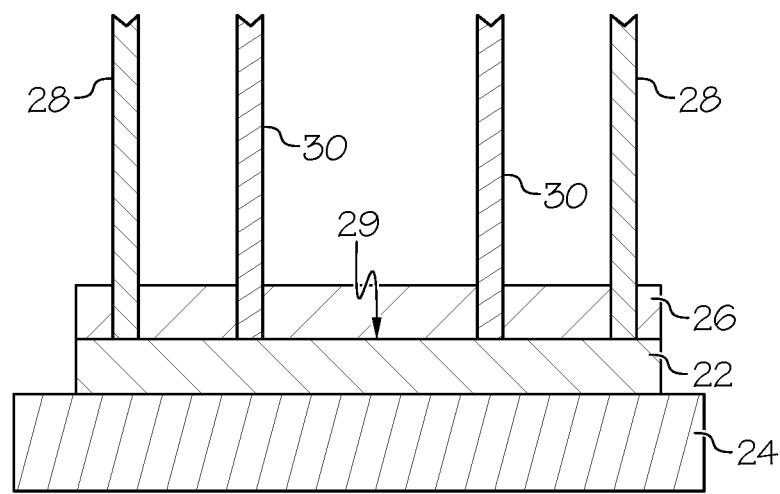

The method 100 continues by providing (120) an uncured additional elastomeric layer 26 on the layer 22 as shown in FIG. 3B. Referring to FIG. 3C, a housing 28 (only an end portion is shown) is positioned (130) such that the end of the housing 28 extends at least partially into the uncured elastomeric layer 26. In some instances, the housing 28 may be positioned so that its end is in contact with the upper surface 29 of the layer 22 of the partially or fully cured elastomeric material. A structure 30, such as a bobbin, (only an end portion is shown) is positioned inside the housing 28 so that the end of the structure 30 extends at least partially into the uncured elastomeric layer 26. Subsequently, the uncured elastomeric layer 26 is cured (140) so that the layer 26 is secured to the ends of the housing 28 and the bobbin 30, and adheres to the membrane 22. In one example, the housing 28 is in the form of a cylindrical tube and the bobbin 30 is configured to move in a direction along the tube axis.

Figure 3D:
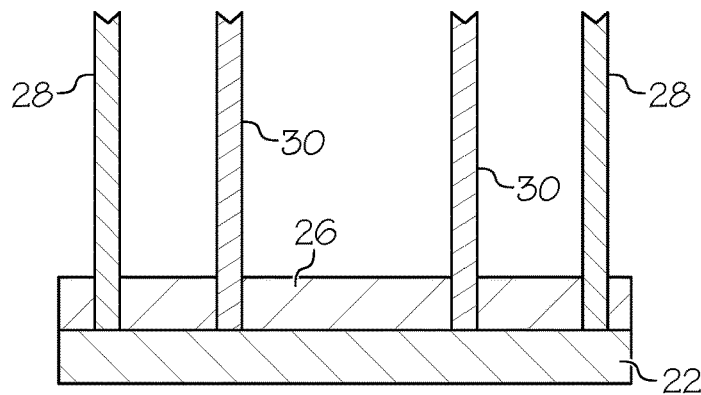
Figure 3E:
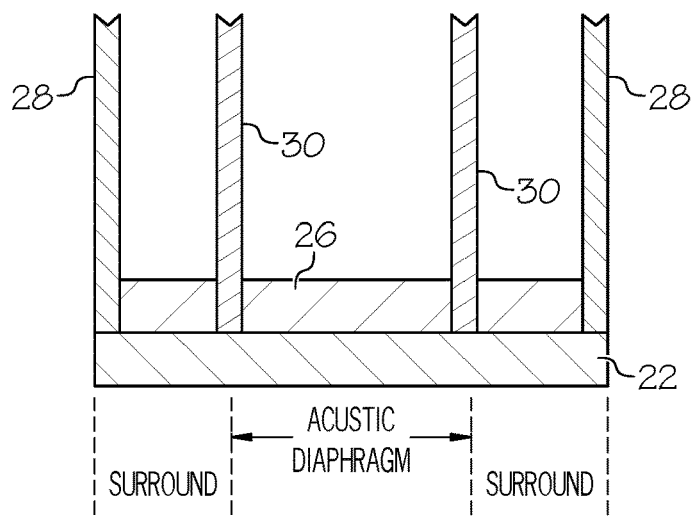

After the final layer 26 is cured, the microspeaker device may be removed from the substrate 24 as shown in FIG. 3D. The removal may include a demolding process in which the compliant member (defined by the combination of layers 22 and 26) is progressively released from the substrate 24, starting from the outside diameter of the device and progressing toward the center. The portion of the compliant member 22 and 26 that extends beyond the outer diameter of the housing 28 can be trimmed or removed by other means to limit the diameter to be approximately equal to the outer diameter of the housing 28 as shown in FIG. 3E. When at rest, the compliant member formed according to the method 100 has a substantially planar shape. The bobbin 30 and a coil (not shown) wound on the outer surface of the bobbin 30 are fully supported by the compliant member, that is, the bobbin 30 is not in contact with any other structure. As described above, the central region of the compliant member, i.e., the area defined within the diameter of the bobbin 30, can be stiffened to form the acoustic diaphragm while the surrounding annular area defines a compliant surround that enables the acoustic diaphragm to moves axially and thereby generate an acoustic signal.

In some examples, the liquid elastomeric material used to form the layers 22 and 26 is liquid silicone. Alternatively, one layer 22 can be formed from an elastomeric material that is different from the elastomeric material of the other layer 26 that is used to secure the housing 28 and bobbin 30. In such implementations, the materials are selected for chemical compatibility to ensure good adherence between the layers 22 and 26.

In the following example, the thickness of the layer 22 is greater than the thickness of the layer 26; however, in other implementations the thickness of the layer 22 may be the same as or less than that of the layer 26. By way of a specific non-limiting numerical example, the thickness of the layer 22 may be 30 µm and the thickness of the additional layer 26 may be 20 µm.

Figure 4:
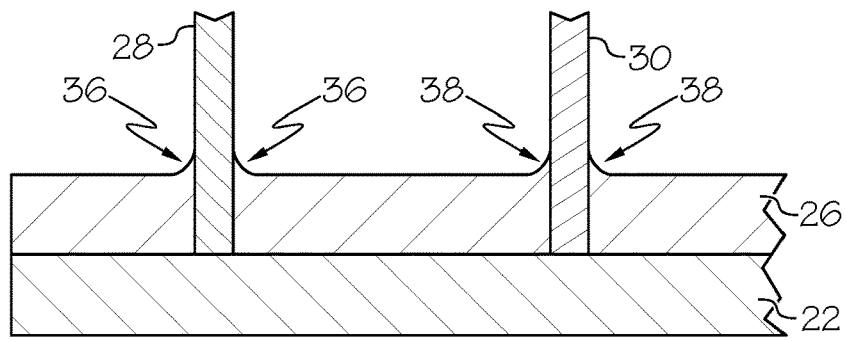
FIG. 4 is a magnified view of a portion of the end of the microspeaker device of FIG. 3D.

Referring to FIG. 4 which shows a magnified view of the end of the housing 28 and the bobbin 30, the depth of the additional layer 26 before curing may be chosen to achieve a liquid meniscus 36 formed at the end of the housing 28 and another liquid meniscus 38 formed at the end of the bobbin 30 of desired sizes. Using a smaller thickness for the additional layer 26 can limit the extent of the menisci 36 and 38 along the housing 28 and bobbin 30. In addition, thinning of the additional layer 26 is less critical when the thickness of the underlying layer 22 is substantially greater than the thickness of the additional layer 26. The extent of the menisci 36 and 38 along the housing 28 and the bobbin 30 should be sufficient to enable support of the bobbin 30 and coil while affording proper adhesion to the underlying layer 22.

Figure 5:
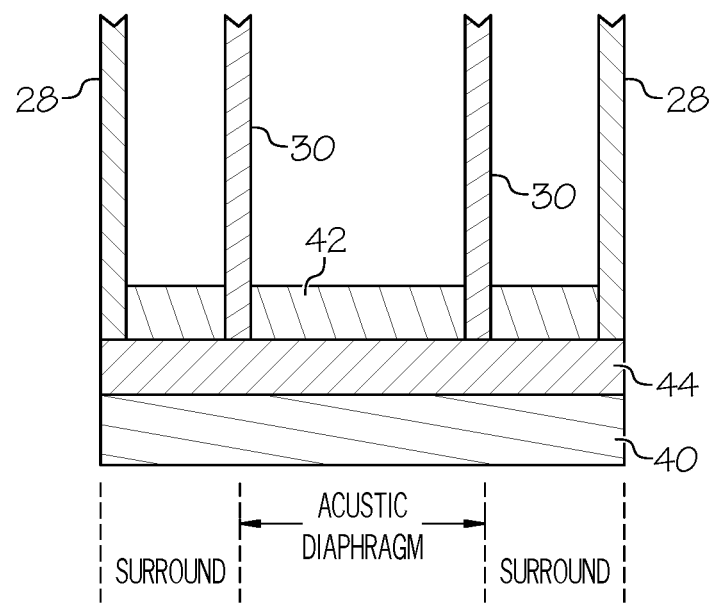
FIG. 5 shows a magnified cross-sectional view of a portion of an alternative microspeaker device.

In some instances the bobbin suspended from the compliant member may exhibit undesirable motion, such as rocking or other non-axial motion. To address this situation, the compliant member may be formed to provide damping, or dissipation, into the suspension. For example, the compliant member may be formed of three layers as shown in FIG. 5. Specifically, two elastomeric silicone layers 40 and 42 may be formed with a low creep silicone and an intermediate layer 44 formed with a more viscous silicone gel. By way of a specific non-limiting example, the upper and lower layers 42 and 40 may be formed from a low creep silicone elastomer such as ELASTOSIL® 3070/OO-20 SM and the intermediate layer 44 may be formed with POWERSIL® silicone gel available from Wacker Chemie AG of Munich, Germany. Although the surround portion which is outside of the outer diameter of the bobbin 30 has increased loss in comparison to a compliant member without the viscous intermediate layer 44, this compliant member has the advantage of limiting the height of a resonance peak and reducing unwanted rocking or sideways motion.

Figure 6:
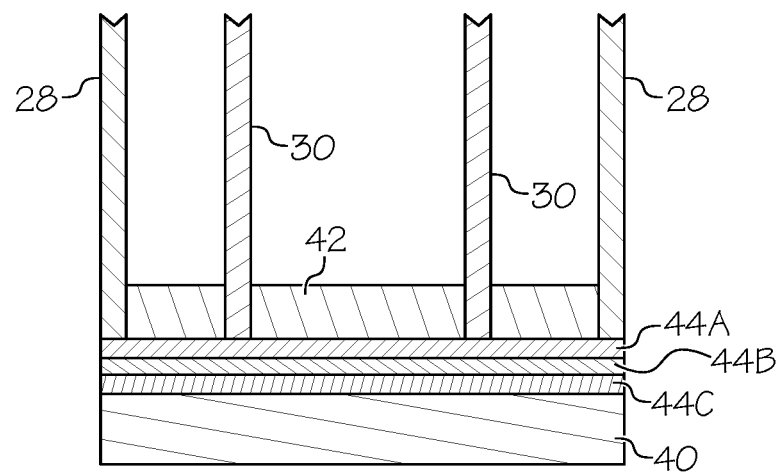
FIG. 6 shows an example of a microspeaker in which the intermediate layer of the microspeaker of FIG. 5 is formed as three individual layers.

FIG. 6 shows an alternative example in which the intermediate layer 44 is formed as three individual layers 44A, 44B and 44C. It should be recognized that any number of layers can be used to "build" the intermediate layer 44. A greater number of layers may be preferred when using lower viscosity elastomeric materials in an uncured state.

The examples described above provide advantages over a compliant member formed from a single layer of an elastomeric material. The boundary at the interface of the compliant member and the housing and/or other structure is better controlled. Generally there is less filleting and thinning of the member near the interface regions. Reduced thinning results in a stronger device that is easier to demold from the flat substrate without tearing the compliant member. Moreover, the stiffness of the suspension provided by the complaint member is more consistently achieved during manufacturing processes in comparison to a single layer compliant member.

A number of implementations have been described. Nevertheless, it will be understood that the foregoing description is intended to illustrate, and not to limit, the scope of the inventive concepts which are defined by the scope of the claims. Other examples are within the scope of the following claims.

What is claimed is:

1. A microspeaker device comprising:
   an acoustic diaphragm having a substantially planar shape, the acoustic diaphragm comprising:
      a first layer of an elastomeric material; and
      a second layer of an elastomeric material disposed on the first layer;
   a housing having an end extending at least partially into the second layer, wherein the second layer adheres to the first layer and to a portion of the housing at the end of the housing;
   a bobbin having a surface and disposed in the housing, the bobbin having an end extending at least partially into the second layer, wherein the second layer adheres to a portion of the bobbin at the end of the bobbin; and
   a coil wound on the surface of the bobbin.

2. The microspeaker device of claim 1 wherein the acoustic diaphragm further comprises at least one intermediate layer disposed between the first layer and the second layer.

3. The microspeaker device of claim 2 wherein the at least one intermediate layer is formed of a viscous elastomeric material.

4. The microspeaker device of claim 3 wherein the at least one intermediate layer comprises a layer formed of an elastomeric material that is more viscous than the elastomeric material of the first layer and the elastomeric material of the second layer.

5. The microspeaker device of claim 1 wherein the first layer has a thickness that is greater than a thickness of the second layer.

6. The microspeaker device of claim 1 wherein at least one of the first and second layers is a silicone layer.

7. The microspeaker device of claim 6 wherein the silicone layer is formed of a room temperature vulcanization silicone.

8. The microspeaker device of claim 1 wherein an area of the acoustic diaphragm defined within a diameter of the bobbin is stiffer than a surrounding annular area of the acoustic diaphragm.

9. The microspeaker device of claim 1 wherein the housing is a tube having an opening at the end.

10. The microspeaker device of claim 1 wherein the elastomeric material of the first layer is different from the elastomeric material of the second layer.

11. The microspeaker device of claim 1 wherein the second layer includes a meniscus formed at a surface of the bobbin or the housing.

12. The microspeaker device of claim 1 wherein the end of the housing is in contact with a surface of the first layer.

13. The microspeaker device of claim 1 wherein the end of the bobbin is in contact with a surface of the first layer.

* * * * *